Nov. 18, 1958   C. C. McCAIN ET AL   2,860,670
APPARATUS FOR TWISTING WIRES
Filed March 9, 1956   6 Sheets-Sheet 1

INVENTORS
C. C. McCAIN
G. STUHLFAUTH
B. L. WRIGHT
BY C. B. Hamilton
ATTORNEY

Nov. 18, 1958     C. C. McCAIN ET AL     2,860,670
APPARATUS FOR TWISTING WIRES
Filed March 9, 1956     6 Sheets-Sheet 2

INVENTORS
C.C. McCAIN
G. STUHLFAUTH
B. L. WRIGHT
BY C. B. Hamilton
ATTORNEY

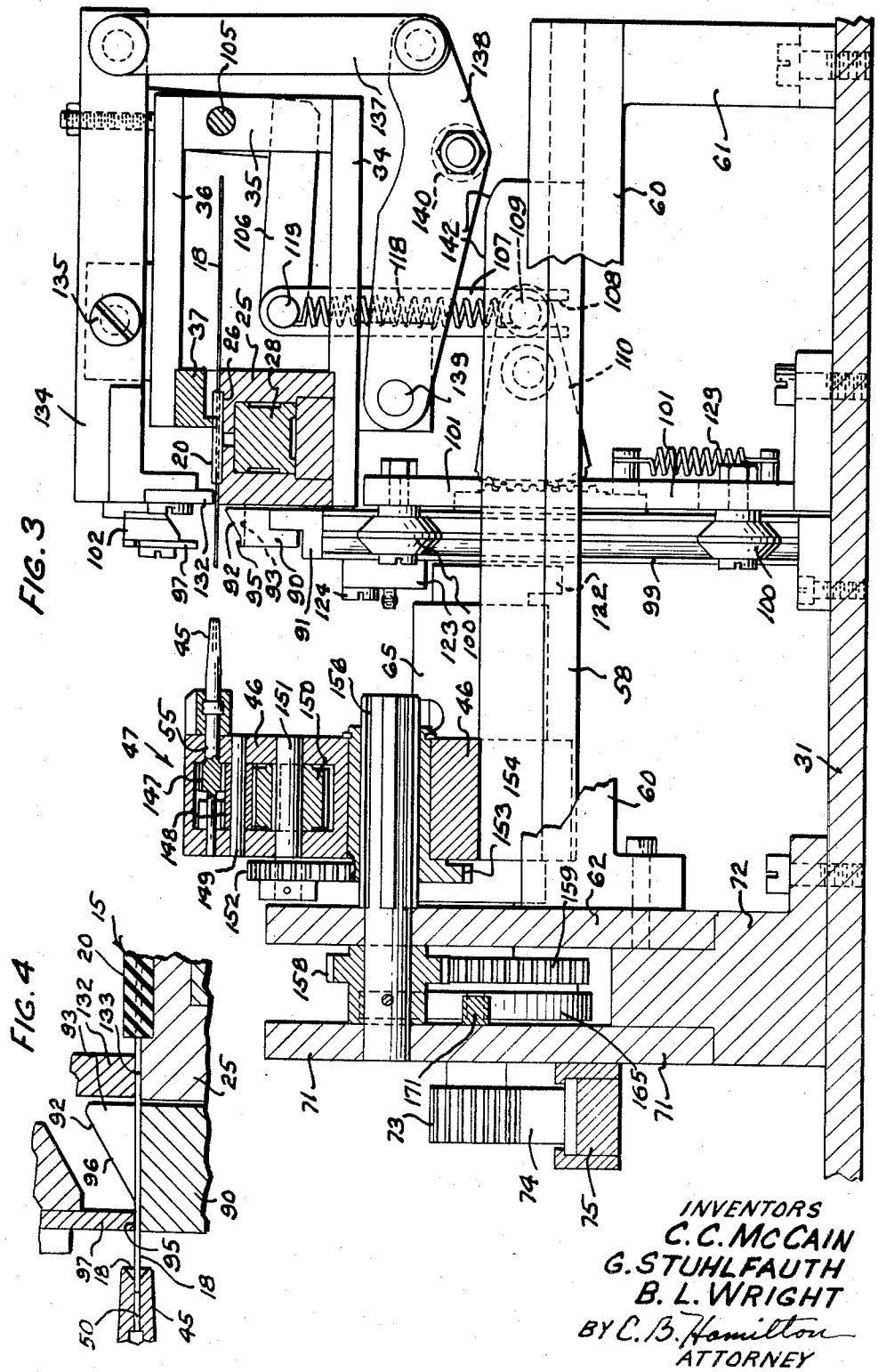

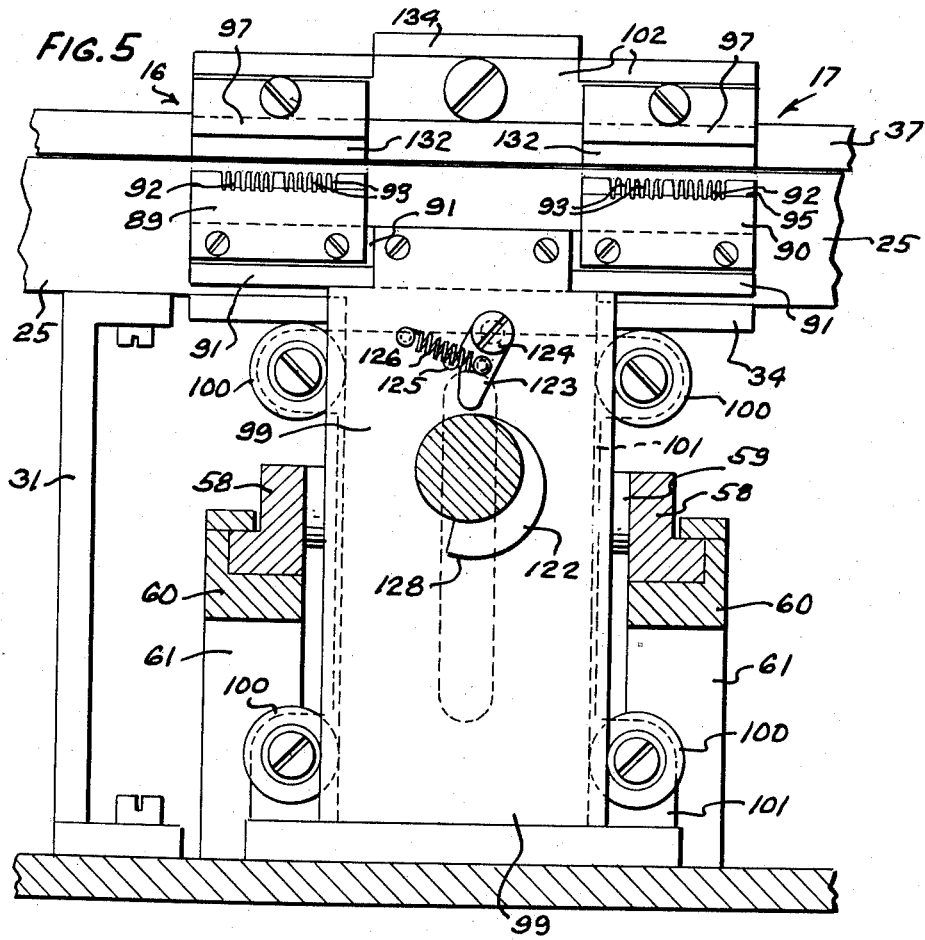
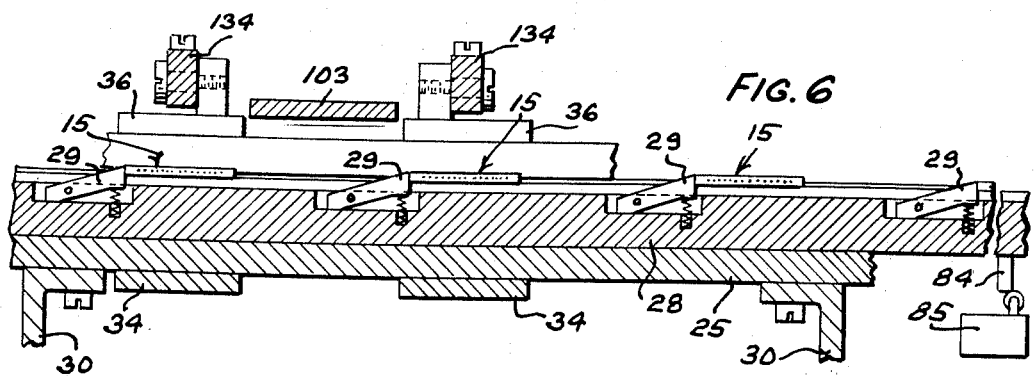

Nov. 18, 1958   C. C. McCAIN ET AL   2,860,670
APPARATUS FOR TWISTING WIRES
Filed March 9, 1956   6 Sheets-Sheet 5
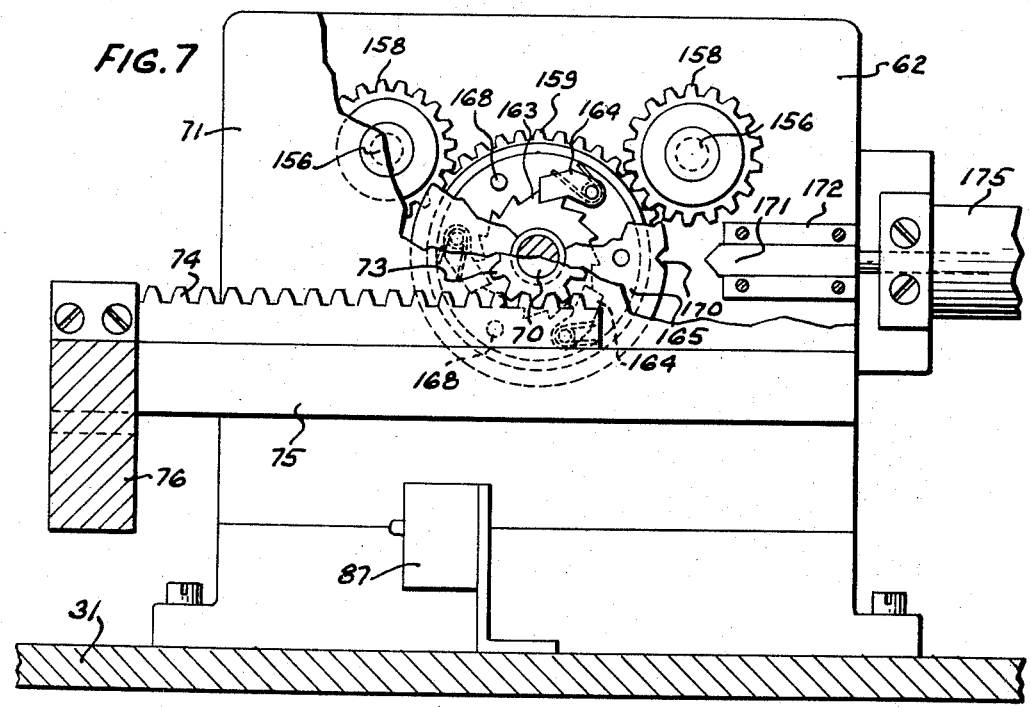
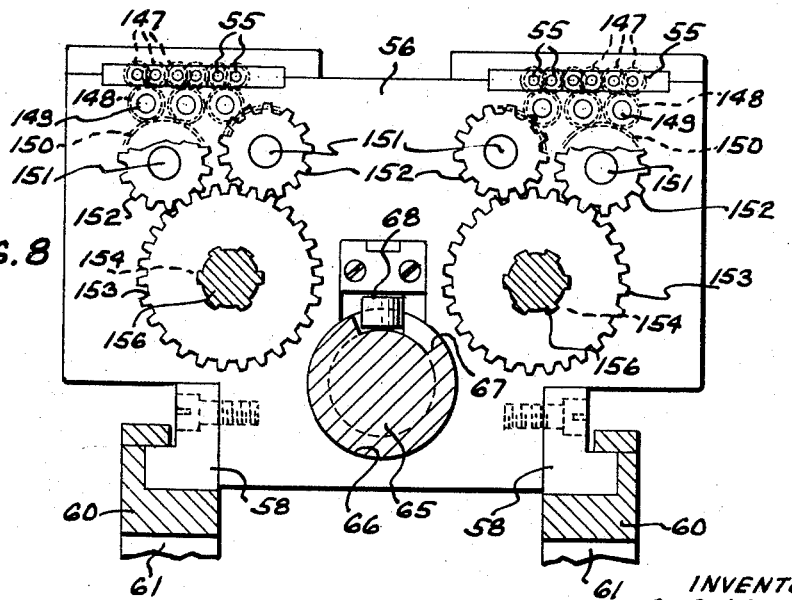
INVENTORS
C. C. McCAIN
G. STUHLFAUTH
B. L. WRIGHT
BY C. B. Hamilton
ATTORNEY

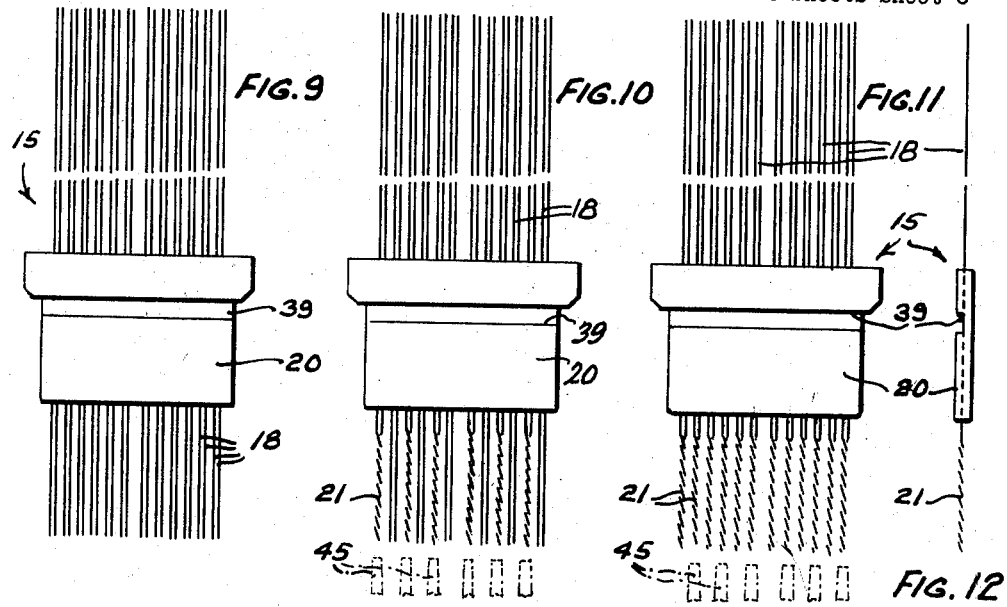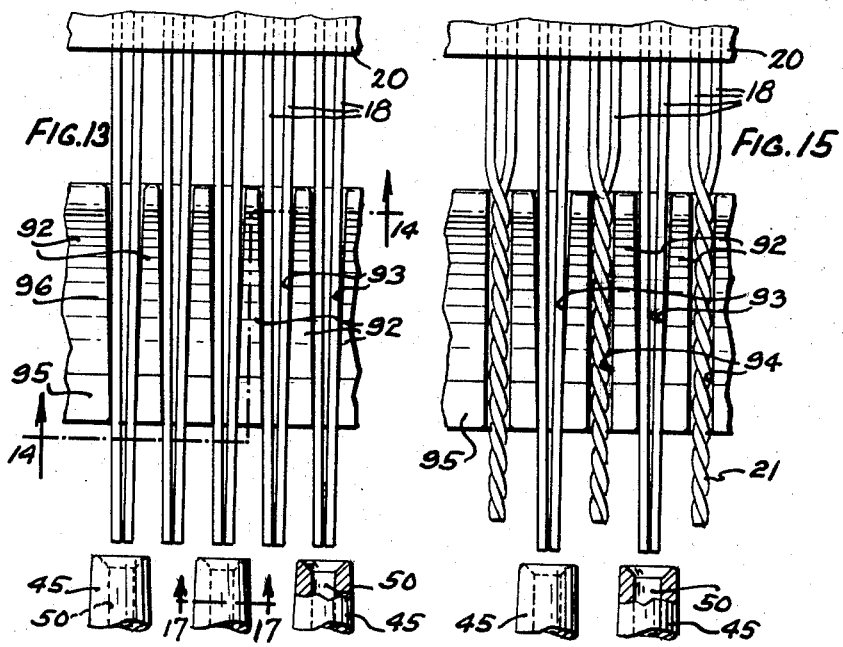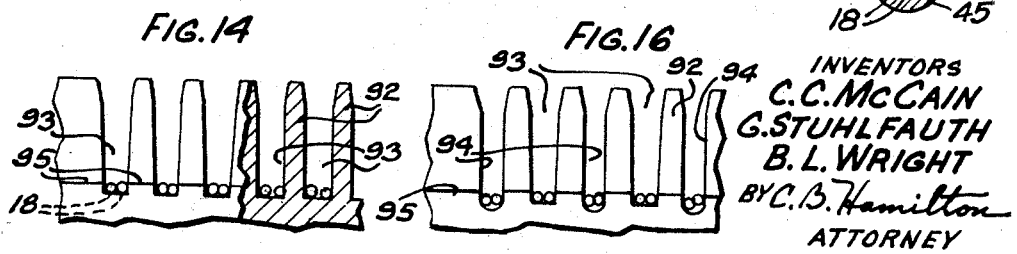

United States Patent Office 2,860,670
Patented Nov. 18, 1958

2,860,670

APPARATUS FOR TWISTING WIRES

Cecil C. McCain, Glen Ellyn, and George Stuhlfauth and Ben L. Wright, Chicago, Ill., assignors to Western Electric Company, Incorporated, New York, N. Y., a corporation of New York Application March 9, 1956, Serial No. 570,607

6 Claims. (Cl. 140—149)

This invention relates to wire twisting apparatus and more particularly to an apparatus for twisting the end portions of pairs of wires on wire spring relay components to form terminals therefor.

An object of the present invention is to provide an effective and efficient apparatus for twisting the end portions of pairs of wires on wire spring relay components to form terminals therefor.

A further object of the invention is to provide a two-station apparatus for twisting alternate pairs of closely positioned wires of a wire spring relay component at one station and for twisting the other pairs of wires at the other station to form a common terminal for each pair of wires.

Apparatus illustrating certain features of the invention may include a mechanism for successively advancing relay components having a row of parallel laterally spaced wire springs into two work stations for aligning alternate pairs of the wire springs at one station and the other pairs of wire springs at the other station with wire twisting spindles mounted for simultaneous rotation on a reciprocable carriage. Clamping members are provided at the stations to clamp the wires of the two relay components at a predetermined distance from one end thereof, and aligning members at the stations are actuated to flex the wires to position the ends of each pair of wires in engagement with each other and in axial alignment with the spindles which are held against rotation as the carriage is advanced to telescope the spindles over a predetermined portion of the pairs of wires. The carriage is then retracted and the spindles are rotated as they are withdrawn from the wires to twist alternate pairs of wires at the first station and the other pairs of wires at the second station through a predetermined number of turns.

Other objects and advantages of the invention will become apparent by reference to the following detailed description and the accompanying drawings, illustrating a preferred embodiment thereof, in which Fig. 1 is a plan view of the apparatus for twisting pairs of wires of wire spring relay components;

Fig. 3 is a longitudinal vertical cross-sectional view taken on line 3—3 of Fig. 1 showing the wire twisting unit in retracted position;

Fig. 4 is an enlarged fragmentary view of the apparatus showing the wire positioning members in operative position in engagement with the wires of the wire spring relay components;

Figs. 5–8 are enlarged vertical cross-sectional views of the apparatus taken on lines 5—5, 6—6, 7—7, and 8—8, respectively, of Fig. 1;

Fig. 9 is a plan view of a wire spring component before the wires are twisted;

Fig. 10 is a plan view of the wire spring relay component showing alternate pairs of wires twisted;

Fig. 11 is a plan view of the wire spring relay showing all of the pairs of wires twisted;

Fig. 12 is a side view of the wire spring relay component shown in Fig. 11;

Fig. 13 is an enlarged fragmentary plan view of a portion of the apparatus showing the wire positioning member at one wire twisting station for positioning pairs of wires with the ends thereof in engagement with each other and in alignment with the wire twisting spindles;

Fig. 14 is a fragmentary sectional elevational view of the wire positioning element taken on line 14—14 of Fig. 13;

Fig. 15 is an enlarged fragmentary view of the wire positioning member in the second wire positioning station and showing a portion of a wire spring relay;

Fig. 16 is a fragmentary front elevational view of the wire positioning member shown in Fig. 15; and Fig. 17 is a cross-sectional view through one of the wire twisting spindles taken on the line 17—17 of Fig. 13.

Figure 1:
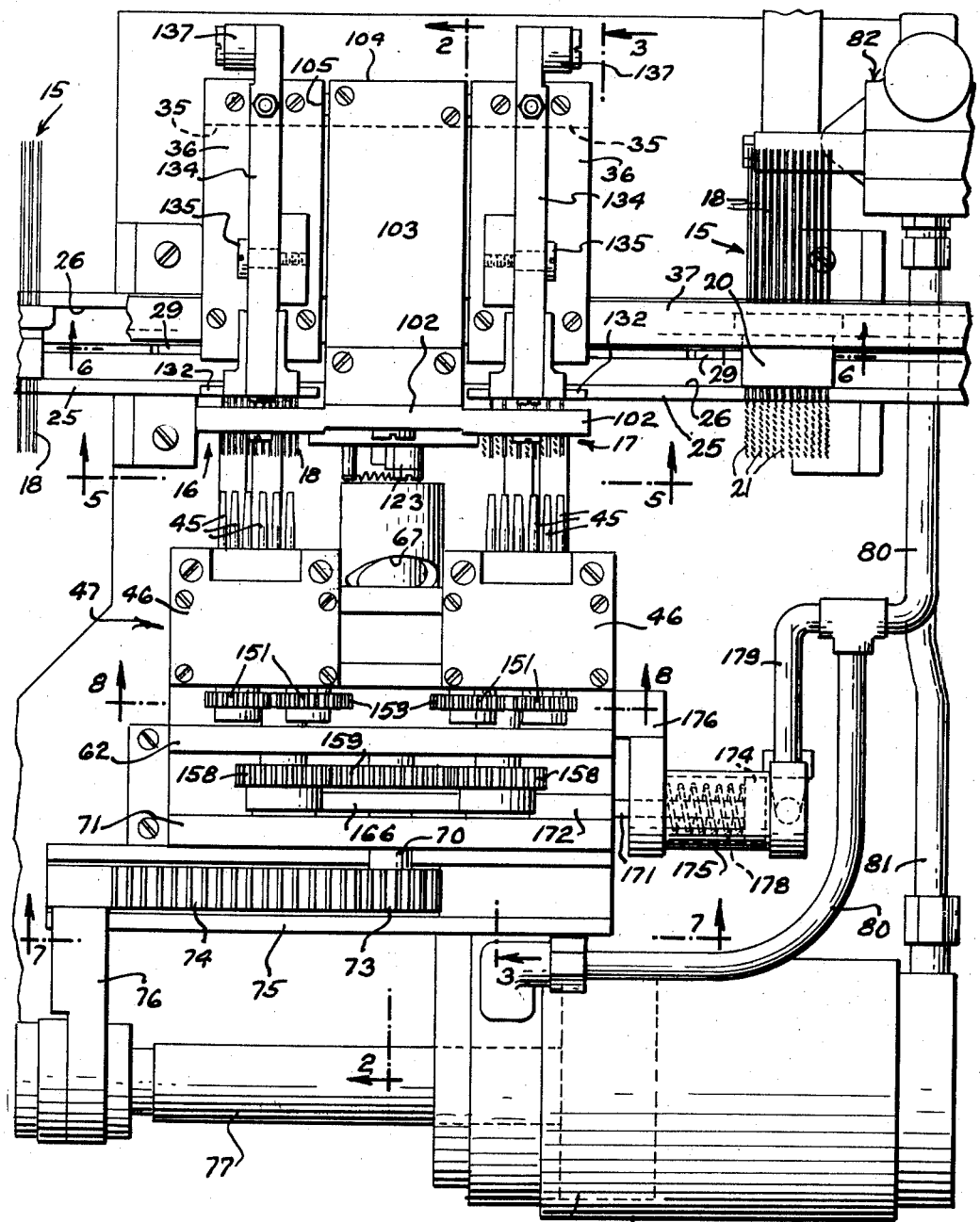

The present apparatus is designed to feed successive wire relay components 15 (Fig. 9) into a pair of wire twisting stations 16 and 17 (Fig. 1), clamp the pairs of wires 18 of the component 15 at a predetermined distance from one end thereof, and twist a predetermined length of the pairs of wires with a predetermined number of turns to form a common terminal 21 for each of the pairs of wire springs. The wires 18 of the relay component are secured in a molded block 20 of dielectric material and are arranged in pairs in laterally spaced and parallel relation to each other. The twisted terminals 21 are subsequently coined to a predetermined cross section for the attachment of electrical conductors thereto.

The relay components 15 are supported on a hollow stationary track 25 (Figs. 1, 2, and 3) which is rectangular in cross section and has a shallow recess 26 forming a guideway for receiving the blocks 20 and guiding the relay components for longitudinal movement. A feed bar 28 is mounted in the track 25 for reciprocable movement and has a plurality of feed pawls 29 which are pivotally mounted thereon and spring urged upwardly into normal operative position through a slot in the track. The feed bar 28 is reciprocated through a predetermined stroke by suitable means (not shown) to cause the feed pawls 29 to engage successive relay components 15 and intermittently advance them successively to the wire twisting stations 16 and 17, and accurately locate them in predetermined positions therein. The track 25 is supported by legs 30 (Fig. 5) which are secured to a base 31 of the apparatus. Secured to the underside of the stationary track 25 at stations 16 and 17 are horizontally disposed frame plates 34 on which are mounted vertically disposed blocks 35 in spaced relation to the track 25. Frame plates 36 are secured to the blocks 35 and have a guide rail 37 secured thereto above the track 25 and the rail has a depending rib 38 for engaging in slots 39 in the blocks 20 of the relay components 15 for retaining the relay components on the track 25.

The relay components 15 are located in the wire twisting stations 16 and 17 (Figs. 1, 10, and 11) so that at station 16 alternate pairs of wires 18 are in alignment with a set of wire twisting spindles 45 supported on a head 46 of a carriage 47, and at the station 17 the other pairs of wires 18 of the relay component are positioned in alignment with another set of wire twisting spindles 45 on the head 46 of the carriage. The spindles 45 have centrally disposed apertures 50 therein for receiving a pair of wires 18 and the forward end portion of the aperture has a substantially rectangular cross section (Fig.

17) for slidably receiving the pair of wires therein in parallel and abutting relation to each other to permit twisting the wires about each other. The ends of the apertures 50 are flared to guide the ends of the wire therein. Each of the spindles 45 is secured to a shaft 55 (Fig. 3) and is mounted for rotation therewith in spindle heads.

Figure 2:
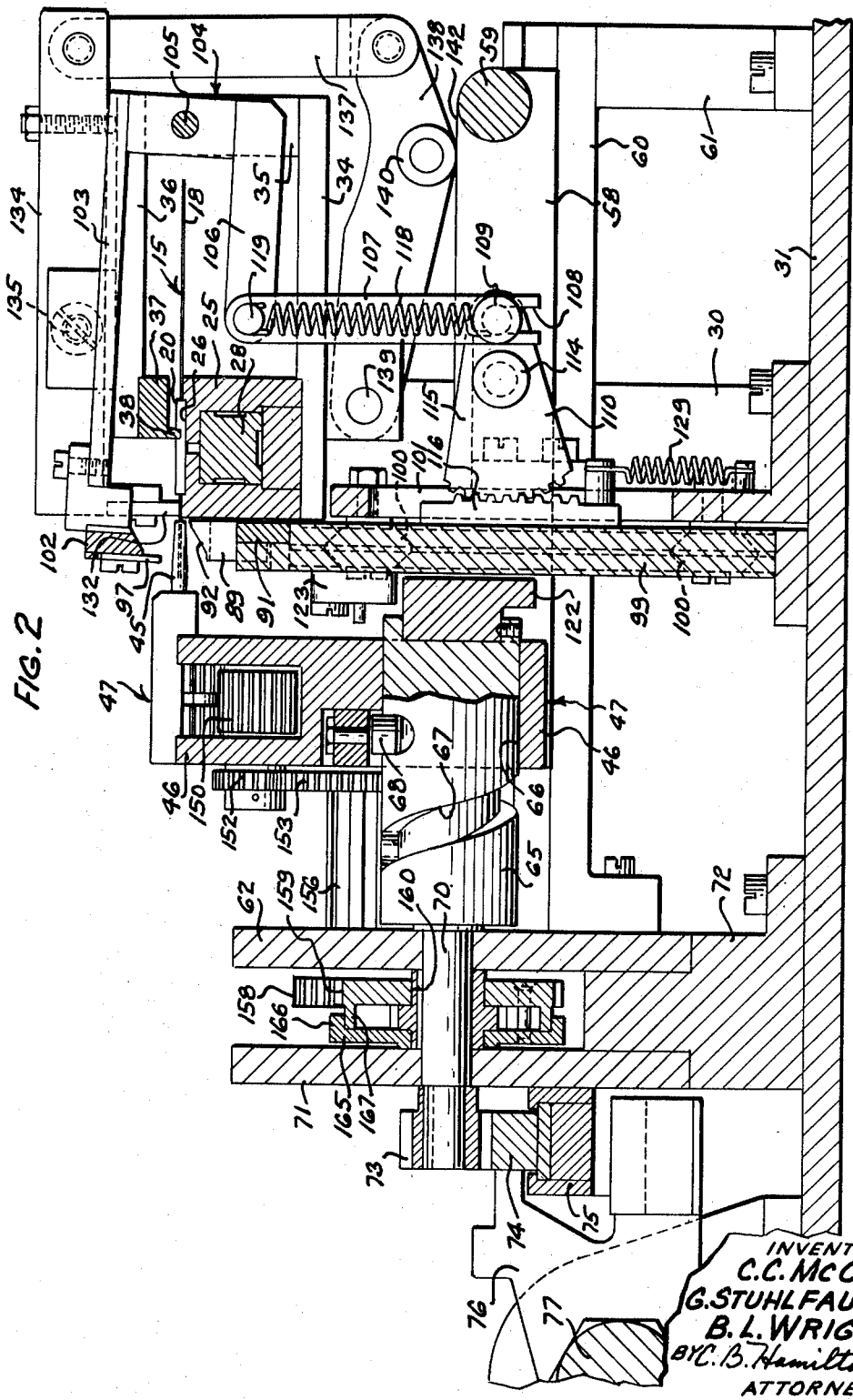
Fig. 2 is an enlarged longitudinal vertical cross sectional view through the apparatus taken on line 2—2 of Fig. 1 and showing the wire twisting unit in its forward position with wire twisting spindles in engagement with the wires of the relay component.

The carriage 47 is horizontally reciprocable from a normal retracted position (Fig. 3) to a forward position (Fig. 2) to move the spindles into telescoping relation with a predetermined length of pairs of wires 18 of the relay component. The carriage 47 includes a pair of horizontally disposed slide bars 58 secured at one end to the head 46 and connected at their other end by a cross bar 59 (Fig. 2). The slide bars 58 are of L-shaped cross section (Fig. 5) and are slidably mounted in horizontally disposed guides or frame members 60 which are supported at one end by legs 61 and are secured at their other end to a vertical frame plate 62.

Reciprocation is imparted to the carriage 47 by a barrel cam 65 (Figs. 1 and 2) which fits in an aperture 66 of the head 46 and has a helical cam groove 67 therein for receiving a cam follower 68 secured to the head 46. The barrel cam 65 has a shaft 70 extending therefrom which is journalled in suitable bearings in the frame plate 62 and a parallel frame plate 71 which are secured to a block 72 mounted on the base plate 31. The shaft 70 has a gear 73 fixed thereto which meshes with a rack 74 slidable in a guide 75 on a frame plate 71. The rack 74 is attached by a connector arm 76 to one end of a piston rod 77 (Fig. 1), the piston 78 of which is reciprocable within a cylinder 79 of an air motor stationarily mounted on the base 31. Compressed air from a suitable source is admitted to opposite ends of the cylinder 79 through conduits 80 and 81 under control of an electrically operated valve 82. As the feed bar 28 (Fig. 6) reaches the end of its feeding movement an arm 84 on the feed bar operates a switch 85 of a control circuit to actuate the valve 82 to one position to admit air in the left hand end of the cylinder 79 as viewed in Fig. 1 to move the piston 78 and the rack bar 74 to the right and effect the movement of the carriage 47 from its normal retracted position (Fig. 3) to its forward operative position (Fig. 2). In response to movement of the rack bar 74 to the end of its forward stroke the arm 76 thereon operates a switch 87 (Fig. 7) in the control circuit to effect the actuation of the valve 82 to its other position and thus causes the rack bar 74 and the carriage 47 to be returned to their normal starting positions.

Means are provided for flexing the parallel wires to position the ends of each pair of wires in engagement with each other and in axial alignment with the twisting spindles 45 to facilitate the entrance of the wires into the apertures 50 of the spindles. This includes positioning members or combs 89 and 90 (Figs. 2, 3, 4, 5, 13-16) at the wire twisting stations 16 and 17, respectively, mounted on a cross bar 91 below the wires 18 of relay components in the stations. The wire positioning members 88 and 89 have a plurality of upwardly projecting teeth 92 forming slots 93 therebetween for receiving a pair of wires 18 in each slot. The teeth 92 have vertical side walls, some of which as viewed from above (Figs. 13 and 15), are disposed in converging relation to each other to form tapering slots 93 for receiving the wires therein and for flexing the ends of the wires toward each other as indicated in dotted lines in Figs. 13 and 15. The slots 93 have flat bottom surfaces for supporting the pair of wires in horizontal alignment with each other and with the twisting spindles 45.

The positioning member 90 at the wire twisting station 17 also has slots 94 therein with parallel side walls for receiving the pairs of wires which have been twisted at station 16. The teeth 92 of the positioning members 89 and 90 have flat horizontal upper surfaces 95 spaced above the bottom surface of the slots 93 a distance slightly greater than the diameter of the wires 18 and have surfaces 96 (Fig. 4) sloping outwardly therefrom to the rounded top of the teeth 92. The upper portion of the flat vertical walls of the teeth are slanted to provide tapered upper ends on the teeth as viewed from the front (Figs. 14 and 16) to facilitate the entrance to the teeth between the pairs of wires as the positioning members 89 and 90 are moved upwardly from their normal lower position shown in Fig. 3 to their wire positioning position (Fig. 4). As the wire positioning members 89 and 90 are moved upwardly the wires 18 are pushed downwardly between the teeth thereon by a pair of hold down elements 97 disposed above the wires 18. When the members 89 and 90 and the bars 97 are in their operative position (Fig. 4) the lower edge of the bars 97 engage and are supported on the surfaces 95 of the members 89, 90 and hold the wires 18 against the bottom surfaces.

The bar 91 on which the wire positioning members 90 are mounted is secured to a vertically disposed slide 99 (Figs. 2, 3, and 5) in the form of a plate having V-shaped grooves along opposite vertical edges thereof for receiving cooperating guide rollers 100 which are mounted on a vertical frame plate 101 secured to the base plate 31. The hold down elements 97 are mounted on an equalizing bar 102 which is secured to one end of an arm 103 of a U-shaped lever 104. This U-shaped lever is pivotally supported on a pin 105 mounted in the frame member 35 and has an arm 106 connected to one end of a link 107, the other end of which has a slot 108 for receiving a pin 109 fixed to a gear sector 110. The gear sector is pivotally supported on a pin 114 on a bracket 115 which is secured to the frame plate 101 and the gear sector meshes with a rack 116 on the slide 99. A pair of springs 118 are connected at one end to the pin 109 on the gear sector and are connected at the other end to a pin 119 on the arm 106 to yieldably maintain the pin 109 in engagement with the end of the slot 108 in the link 107 to form a yieldable connection between the gear sector 110 and the U-shaped lever 104. In response to movement of the slide 99 the rack 116 thereon oscillates the gear sector and actuates the U-shaped lever 104 to move the hold down elements 97 downwardly simultaneously with the upward movement of the wire positioning members 89 and 90.

The wire positioning members 89, 90 and the hold down elements 97 are actuated in timed relation to the forward movement of the carriage 47 by a cam 122 (Figs. 2, 3, and 5) which is fixed to the end of the barrel cam 65 for oscillation therewith. The cam 122 engages a cam follower 123 in the form of a pawl which is pivotally mounted on the slide 99 for oscillatable movement about a pin 124 and is yieldably held in a normal position against the pin 125 by a spring 126. One complete revolution of the barrel cam 65 is required to advance the carriage 47 from its retracted position to its forward position, and the cam 122 during approximately the first 150° of its rotation, serves to raise the slide 99 and actuate the wire positioning members 89, 90 and the hold down elements 97 to flex the pairs of wires and position the ends thereof in engagement with each other in advance of the movement of the wire twisting spindles 45 into telescoping engagement with the end portions thereof. When the spindles have received the ends of the pairs of wires 18 therein the cam follower 123 rides off of the shoulder 128 on the cam 122 and a spring 129 (Figs. 2 and 3) pulls the slide 99 down and causes the wire positioning members 89, 90 and the hold down elements 97 to return to their normal separated position (Fig. 2) to provide clearance for the remainder of the movement of the wire twisting spindles to their forward position. During the return movement of the cam 122, the cam follower 123 swings about its pivot.

A pair of clamping jaws 132 and 133 (Figs. 3, 4, and 5) are provided at each of the wire twisting stations 16 and 17 for clamping the wires 18 along a line parallel to and a predetermined distance from the ends thereof to hold them while they are being twisted and thereby control the length of the twisted portions of the wires. The lower stationary jaws 133 are formed as part of the stationary track 25. The upper movable clamping jaw 132 at each station is mounted on the end of a lever 134 pivotally mounted at 135 on the frame plate 36 and connected at the other end to a link 137. The other end of the link 137 is connected to one end of a lever 138 which is pivotally supported at 139 to the frame plate 34 and has a cam follower 140 engageable with cam surface 142 on the upper and end portions of the slide bars 58 of the twisting unit 45. Thus, during a predetermined portion of the advance movement of the carriage 47 the cam surfaces 142 thereon actuate the levers 138 and cause the upper clamping jaws 132 to clamp the pairs of wires 16 against the stationary jaw 133 and hold them against movement while the free ends thereof are being twisted.

When the carriage 47 and the rack 74 reach the end of their forward movements the connector arm 76 on the rack actuates the switch 87 which causes the shifting of the control valve 82 to its other position. This reverses the flow of air to the air motor and effects the movement of the rack bar in the opposite direction to return the carriage 47 to its normal retracted position, during which return movement rotation is imparted to the wire twisting spindles 45 as they are withdrawn from the pairs of wires 18 to cause the spindles to twist the pairs of wires about themselves with a predetermined number of uniform twists.

The spindle shafts 55 are provided with gears 147 which mesh with gears 148 on shafts 149 which in turn are journalled in the head 46 of the carriage 47, and the gears 148 mesh with gears 150 on shafts 151 rotatably supported in the head 46. The shafts 151 have gears 152 secured thereto which mesh with two gears 158 formed on two hollow splined shafts 154 which are rotatably supported in the head 46 and are slidably connected to two splined drive shafts 156 for rotation therewith and for axial movement relative thereto. The two drive shafts 156 are journalled in bearing apertures in the frame plates 62 and 71 and have gears 158 secured thereto which mesh with a drive gear 159. The gear 159 is rotatably supported on the hub of a ratchet wheel 163 which is keyed to the shaft 70, and a plurality of pawls 164 pivotally mounted on the gear 159 are spring urged into engagement with the teeth of the ratchet wheel 163 to effect a driving connection between the gear and the ratchet when the ratchet wheel 163 and shaft 70 are rotating in a clockwise direction as viewed in Fig. 7 during return movement of the carriage 47. During counterclockwise rotation of the shaft 70 and the ratchet wheel 163 and as the carriage 47 moves forward, the pawls 164 ride over the teeth of the ratchet wheel so that no rotation is imparted to the driving gear 159 and spindles 45.

Means are provided for holding the drive gear 159 and the spindles 45 against rotation during forward movement of the carriage 47 which comprises an apertured disc 165 rotatably supported on the other hub of the ratchet wheel 163. The disc has a peripheral flange 166 telescopingly engaging a cylindrical spacing flange 167 on the gear 159 and is secured to the gear 159 for rotation therewith by a plurality of screws 168. The disc 165 is provided with a V-shaped notch 170 (Fig. 7) which is engageable by the V-shaped end portion of a locking plunger 171. This plunger is supported for sliding movement in a guide block 172 mounted on the vertical frame plate 71 and is connected to a piston 174 which is reciprocable in a cylinder 175 stationarily supported in a bracket 176 on the frame plate 62. The piston 174 and the locking plunger 171 are moved to a normal retracted position by a spring 178 within the cylinder, and air is admitted from the line 80 through a pipe 179 to the cylinder to actuate the piston 174 and move the locking plunger 171 into the notch 170 of the disc to hold the disc against rotation.

In the operation of the apparatus the relay components 15 which are placed upon the track 25 by any suitable means are advanced step by step and are accurately positioned successively in the wire twisting stations 16 and 17 by the feed pawls 29 in response to reciprocation of the feed bar 28. At the end of the forward or feeding movement of the feed bar 28 an arm 84 thereon (Fig. 6) operates the switch 85 to cause the valve 82 to shift to its other position to admit compressed air to the cylinder 175 and to the left end of the cylinder 69 to actuate the locking plunger 171 and the piston 78. The rack 74 is moved by the piston 78 to the right as viewed in Figs. 1 and 7 and rotates the cam shaft 70, the cams 65, 122, and the ratchet wheel 163 through one revolution in a counterclockwise direction to effect the advancing movement of the wire carriage 47 while the disc 165 and the twisting spindles 45 are locked against rotation by the plunger 171. As the carriage 47 advances the cam surfaces 142 on the slide bars 58 thereof engage the cam followers 140 of the levers 138 and actuate the pair of clamping jaws 132 to clamp the wires 18 against the lower stationary jaws 133 and hold them against movement while the wires are being twisted on the return movement of the carriage 47. During the first half turn of the shaft 70 the cam 122 actuates the slide 99 to raise the wire positioning members 89, 90 and simultaneously lower the hold down elements 97 to force the wires between the teeth 92 and thereby flex and position the end portions of the pairs of wires in engagement with each other prior to the engagement thereof by the spindles 45. After the spindles have engaged the end portions of the pairs of wires which are to be twisted the cam shoulder 127 is disengaged from the cam follower 123 and the slide 99 is pulled down, causing the separation of the wire positioning members 89, 90 and the hold down elements 97 thereby providing clearance for movement of the spindles 45 to their forward position as shown in Fig. 2. During this forward movement of the carriage 47 the spindles are held against rotation as previously mentioned and with the rectangular apertures 50 therein disposed in horizontal position.

As the carriage 47 reaches its forward position and the rack 74 reaches the end of its stroke, the arm 76 on the rack actuates the switch 87 which causes the valve 82 to shift to its first position, thereby disconnecting the air from the cylinder 175 and from the left end of the cylinder 79 and connecting the air to the right end of the cylinder 79 to cause the return movement of the piston 78 and the rack 74 to their starting positions during which return movement the rack rotates the cam shaft 70, cams 65, 122 and ratchet wheel 163 through one revolution in a clockwise direction. The rotation of the cam 65 returns the carriage 47 to its retracted position and simultaneously therewith the ratchet wheel 63 rotates the gear 159 and the spindles 45 to twist the pairs of wires 18 through a predetermined number of turns as the spindles 45 are withdrawn from the wires.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus having first and second wire twisting stations for twisting wires of a relay part having a row of wires disposed in parallel and closely spaced relation to each other, means for intermittently feeding relay parts successively to the first and the second stations, a carriage, a plurality of apertured wire twisting spindles on said carriage aligned with alternate pairs of wires of a relay part at said first station and with the other pairs of wires at the second station, means for reciprocating the carriage in a direction parallel to the wires of the relay parts in said stations to telescope the spindles over a predetermined portion of pairs of the wires and withdraw the spindles therefrom, clamping means for clamping the pairs of wires at predetermined distances from the ends thereof to limit the length of the portion of the wires being twisted, means for flexing the wires of the pairs of wires to be twisted to move the ends thereof into engagement with each other to facilitate the telescoping of the spindles thereonto, and means for rotating the spindles during the withdrawal movement of the spindle to twist the pairs of wires.

2. In an apparatus having a pair of wire twisting stations for twisting wires of a relay part having a plurality of pairs of wires disposed in a row in parallel and closely spaced relation to each other, means for intermittently feeding relay parts successively to the first and the second wire twisting stations, a plurality of wire twisting spindles aligned with alternate pairs of wires of a relay part at said first station and with the other pairs of wires at the second station, means for reciprocating said spindles in a direction parallel to the wires of the relay parts in said stations to telescope the spindles over a predetermined portion of pairs of the wires and withdraw the spindles therefrom, and means for rotating the spindles during the withdrawal movement of the spindle to twist the pairs of wires.

3. In an apparatus having a pair of wire twisting stations for twisting wires of a relay part having a plurality of pairs of wires disposed in a row in parallel and closely spaced relation to each other, means for intermittently feeding relay parts successively to the first and the second stations, a plurality of apertured wire twisting spindles aligned with alternate pairs of wires of a relay part at said first station and with the other pairs of wires at the second station, means for reciprocating said spindles in a direction parallel to the wires of the relay parts in said stations to telescope the spindles over a predetermined portion of pairs of the wires and withdraw the spindles therefrom, means for flexing the wires of the pairs of wires to be twisted to move the ends thereof into engagement with each other and in axial alignment with the spindles to facilitate the telescoping of the spindles thereonto, and means for rotating the spindles during the withdrawal movement of the spindle to twist the pairs of wires.

4. In an apparatus having a pair of wire twisting stations for twisting wires of a relay part having a plurality of pairs of wires disposed in a row in parallel and closely spaced relation to each other, a frame, means on said frame for supporting the relay parts at the first and the second stations, means for intermittently feeding relay parts successively to the first and the second stations, a carriage mounted movably on the frame, a plurality of apertured wire twisting spindles on said carriage aligned with alternate pairs of wires of a relay part at said first station and with the other pairs of wires at the second station, means for reciprocating the carriage in a direction parallel to the wires of the relay parts in said stations to telescope the spindles over a predetermined portion of the pairs of wires and withdraw the spindles therefrom, a pair of clamping members mounted on the supporting means at each station for clamping the wires at points a predetermined distance from the ends of the wires to limit the extent of twisting thereof, a pair of wire positioning members mounted on the supporting means at each station disposed on opposite sides of the row of wires mounted for movement toward each other for aligning said wires in a plane, wire positioning elements on one of said wire positioning members for flexing the wires of the pairs of wires toward each other in said plane to position the ends thereof in engagement with each other and in the path of movement of the spindles, means on the carriage for actuating said clamping members and said wire positioning members in timed relation to the movement of the wire twisting unit, and means for rotating the spindles during the withdrawal of the spindles from the wires to twist the pairs of wires.

5. In an apparatus for twisting end portions of pairs of parallel wires of relay components, the combination of a base, a track mounted on said base for supporting relay components for movement along a predetermined path with portions of the wires extending over and beyond the track, a feed bar reciprocable on the track for advancing the relay components successively into a predetermined wire-twisting position, a wire-twisting spindle having an axially disposed recess for receiving said pair of wires, means on said base for supporting said spindle for rotation about an axis parallel to and disposed between the pair of wires of a relay component in said wire-twisting position and for reciprocable movement along said axis, means operable in timed relation to the feed bar for reciprocating the spindle-supporting means through a predetermined distance toward and away from the track and the relay component in said wire-twisting position to cause the spindle to telescope over a predetermined portion of the wires and to withdraw therefrom, means operable in timed relation to the reciprocation of the spindle-supporting means for clamping the wires to the track at points a predetermined distance from the ends thereof, and means operable in timed relation to the movement of said spindle-supporting means from the track for rotating the spindle to twist the wires about each other as they are withdrawn from the spindle.

6. In an apparatus for twisting end portions of pairs of parallel wires of relay components, the combination of a base, a track mounted on said base for supporting relay components for movement along a predetermined path with portions of the wires extending over and beyond the track, a feed bar reciprocable on said track for advancing the relay components successively into a predetermined wire-twisting position, a wire-twisting spindle having an axially disposed recess for receiving a pair of said wires, means on said base for supporting said spindle for rotation about an axis disposed parallel to and midway between a pair of wires of a relay component in said wire-twisting position and for reciprocable movement along said axis, means operable in timed relation to the feed bar for reciprocating the spindle-supporting means through a predetermined distance toward and away from the track and the relay component in said wire-twisting position to cause the spindle to telescope over a predetermined portion of the pair of wires and to withdraw therefrom, means operable in timed relation to the reciprocation of the spindle-supporting means for clamping the wires to the track at points spaced from the ends thereof, means operable in response to the initial portion of the movement of the spindle-supporting means toward the track for flexing the wires toward each other to position the ends thereof together in alignment with the recess of said spindle, and means operable in timed relation to the movement of said spindle-supporting means from the track for rotating the spindle to twist the wires uniformly about each other as they are withdrawn from the spindle.

References Cited in the file of this patent
UNITED STATES PATENTS

| | | |
|---|---|---|
| 2,337,055 | Mathias | Dec. 21, 1943 |
| 2,443,564 | Kunkle | June 15, 1948 |
| 2,551,358 | Andren | May 1, 1951 |
| 2,649,121 | Reck | Aug. 18, 1953 |
| 2,649,122 | Mallina | Aug. 18, 1953 |